United States Patent
Vempati et al.

(10) Patent No.: US 8,954,383 B1
(45) Date of Patent: Feb. 10, 2015

(54) ANALYZING MAPPING OBJECTS OF FILE SYSTEMS

(75) Inventors: Srinivasa Rao Vempati, Upton, MA (US); Dixitkumar Vishnubhai Patel, Monroe, NJ (US); Jean-Pierre Bono, Westborough, MA (US); Ming Yang, Shanghai (CN); Marshall Hansi Wu, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 9 days.

(21) Appl. No.: 13/538,534

(22) Filed: Jun. 29, 2012

(51) Int. Cl.
*G06F 17/30* (2006.01)

(52) U.S. Cl.
CPC ............... *G06F 17/30088* (2013.01)
USPC ........................................... 707/610

(58) Field of Classification Search
CPC .................................... G06F 17/30088
USPC .......... 707/999.002, 637, 655, 687, 691, 690, 707/697, 698, 703, 706, 715, 756, 763, 778, 707/802, 821
See application file for complete search history.

(56) References Cited

U.S. PATENT DOCUMENTS

| | | | |
|---|---|---|---|
| 5,893,140 A | 4/1999 | Vahalia et al. | |
| 6,324,420 B1 | 11/2001 | Kishida et al. | |
| 6,324,581 B1 * | 11/2001 | Xu et al. | 709/229 |
| 6,389,420 B1 * | 5/2002 | Vahalia et al. | 1/1 |
| 6,993,539 B2 * | 1/2006 | Federwisch et al. | 1/1 |
| 7,072,910 B2 * | 7/2006 | Kahn et al. | 707/639 |
| 7,437,523 B1 * | 10/2008 | Ting et al. | 711/161 |
| 7,562,077 B2 * | 7/2009 | Bisson et al. | 1/1 |
| 7,676,514 B2 * | 3/2010 | Faibish et al. | 707/646 |
| 7,707,165 B1 * | 4/2010 | Jiang et al. | 707/806 |
| 7,921,110 B1 * | 4/2011 | Ting et al. | 707/736 |
| 8,032,498 B1 | 10/2011 | Armangau et al. | |
| 8,176,018 B1 * | 5/2012 | Bisson et al. | 707/690 |
| 2004/0059822 A1 | 3/2004 | Jiang et al. | |
| 2005/0065986 A1 * | 3/2005 | Bixby et al. | 707/204 |
| 2005/0240628 A1 * | 10/2005 | Jiang et al. | 707/104.1 |

* cited by examiner

*Primary Examiner* — Jay Morrison
*Assistant Examiner* — Ken Hoang
(74) *Attorney, Agent, or Firm* — Deepika Bhayana; Jason A. Reyes; Krishnendu Gupta

(57) ABSTRACT

A method is used in analyzing mapping objects of file systems. Each mapping object of a set of mapping objects of files of a file system is analyzed by iterating over the set of mapping objects. A file is associated with a first mapping object of the set of mapping objects and a snapshot copy of the file is associated with a second mapping object of the set of mapping objects. The second mapping object shares a subset of a set of storage objects associated with the first mapping object. Information for each storage object of the set of storage objects associated with each mapping object of the set of mapping objects is stored. Based on the stored information, each storage object of the set of storage objects associated with each mapping object of the set of mapping objects is processed.

14 Claims, 12 Drawing Sheets

LOGICAL VIEW MAPPED TO FILESYSTEM BLOCKS

ANALYZING MAPPING OBJECTS OF FILE SYSTEMS

BACKGROUND

1. Technical Field

This application relates to analyzing mapping objects of file systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

The accuracy and consistency of a file system is necessary to relate applications and data used by those applications. However, there may exist the potential for data corruption in any computer system and therefore measures are taken to periodically ensure that the file system is consistent and accurate. In a data storage system, hundreds of files may be created, modified, and deleted on a regular basis. Each time a file is modified, the data storage system performs a series of file system updates. These updates, when written to a disk storage reliably, yield a consistent file system. However, a file system can develop inconsistencies in several ways. Problems may result from an unclean shutdown, if a system is shut down improperly, or when a mounted file system is taken offline improperly. Inconsistencies can also result from defective hardware or hardware failures. Additionally, inconsistencies can also result from software errors or user errors.

Additionally, the need for high performance, high capacity information technology systems is driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable and highly efficient so that critical data is not lost or unavailable.

A file system checking (FSCK) utility provides a mechanism to help detect and fix inconsistencies in a file system. The FSCK utility verifies the integrity of the file system and optionally repairs the file system. In general, the primary function of the FSCK utility is to help maintain the integrity of the file system. The FSCK utility verifies the metadata of a file system, recovers inconsistent metadata to a consistent state and thus restores the integrity of the file system.

File systems typically include metadata describing attributes of a file system and data from a user of the file system. A file system contains a range of file system blocks that store metadata and data. A user of a filesystem access the filesystem using a logical address (a relative offset in a file) and the file system converts the logical address to a physical address of a disk storage that stores the file system. Further, a user of a data storage system creates one or more files in a file system. Every file includes an index node (also referred to simply as "inode") that contains the metadata (such as permissions, ownerships, timestamps) about that file. The contents of a file are stored in a collection of data blocks. An inode of a file defines an address map that converts a logical address of the file to a physical address of the file. Further, in order to create the address map, the inode includes direct data block pointers and indirect block pointers. A data block pointer points to a data block of a file system that contains user data. An indirect block pointer points to an indirect block that contains an array of block pointers (to either other indirect blocks or to data blocks). There may be many levels of indirect blocks arranged in an hierarchy depending upon the size of a file where each level of indirect blocks includes pointers to indirect blocks at the next lower level.

A file may be replicated by using a snapshot copy facility that creates one or more replicas (also referred to as "snapshot copies") of the file. A replica of a file is a point-in-time copy of the file. Further, each replica of a file is represented by a version file that includes an inheritance mechanism enabling metadata (e.g., indirect blocks) and data (e.g., direct data blocks) of the file to be shared across one or more versions of the file. Snapshot copies are in widespread use for on-line data backup. If a file becomes corrupted, the file is restored with its most recent snapshot copy that has not been corrupted.

A file system based snapshot copy facility is described in Bixby et al. U.S. Patent Application Publication 2005/

0065986 published Mar. 24, 2005, incorporated herein by reference. When a snapshot copy of a file is initially created, it includes only a copy of the file. Therefore the snapshot copy initially shares all of the data blocks as well as any indirect blocks of the file. When the file is modified, new blocks are allocated and linked to the file to save the new data, and the original data blocks are retained and linked to the inode of the snapshot copy. The result is that disk space is saved by only saving the difference between two consecutive versions of the file.

The sharing of file system data blocks conserves data storage for storing files in a data storage system. The snapshot copy facility is a space saving technology that enables sharing of file system data blocks among versions of a file.

While replication and snapshot copy utilities have helped make data management much easier, they also come with a number of challenges, especially when recovering data. A FSCK utility may require a large amount of time and storage resources to recover a file system that has been replicated by the snapshot facility.

SUMMARY OF THE INVENTION

A method is used in analyzing mapping objects of file systems. Each mapping object of a set of mapping objects of files of a file system is analyzed by iterating over the set of mapping objects. A file is associated with a first mapping object of the set of mapping objects and a snapshot copy of the file is associated with a second mapping object of the set of mapping objects. The second mapping object shares a subset of a set of storage objects associated with the first mapping object. Information for each storage object of the set of storage objects associated with each mapping object of the set of mapping objects is stored. Based on the stored information, each storage object of the set of storage objects associated with each mapping object of the set of mapping objects is processed.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
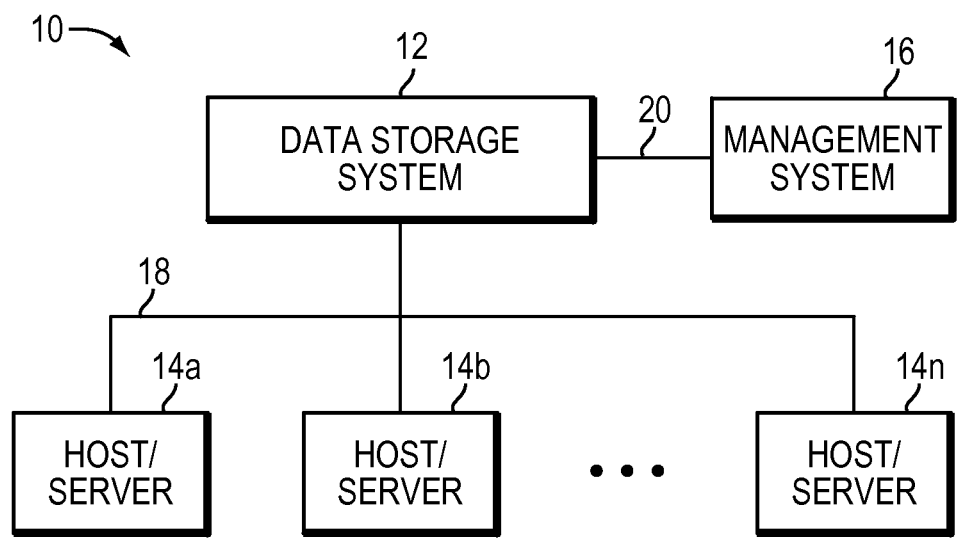
FIGS. 1-3 are examples of an embodiment of a computer system that may utilize the techniques described herein.

Described below is a technique for use in analyzing mapping objects of file systems, which technique may be used to provide, among other things, analyzing each mapping object of a set of mapping objects of files of a file system by iterating over the set of mapping objects, where a file is associated with a first mapping object of the set of mapping objects and a snapshot copy of the file is associated with a second mapping object of the set of mapping objects, where the second mapping object shares a subset of a set of storage objects associated with the first mapping object, storing information for each storage object of the set of storage objects associated with each mapping object of the set of mapping objects, based on the information stored, processing each storage object of the set of storage objects associated with each mapping object of the set of mapping objects.

A file is uniquely identified by a file system identification number. Each data block of a file is referenced by a logical block number and/or file system block number. A logical block number of a file refers to a data block by relative position of the data block inside the file. A file system block number of a file refers to a data block by relative position of the data block on a physical disk device on which the file is stored. A file system block number for a data block is computed based on a file offset and the size of the data block. Further, an inode of a file includes metadata that provides a mapping to convert a file system block number of a data block to its corresponding logical block number. For example, in case of a data block size of 4 kilobytes (KB), if a file offset value is smaller than 4096 bytes, the file offset corresponds to the first data block of the file, which has file block number 0. Further, for example, if a file offset value is equal to or greater than 4096 bytes and less than 8192 bytes, the file offset corresponds to the second data block of the file, which has file block number 1.

Generally, each file system data block of a file is associated with a respective mapping pointer. A mapping pointer of a file system block points to the file system block and includes metadata information for the file system block. A file system block associated with a mapping pointer may be a data block or an indirect data block which in turn points to other data blocks or indirect blocks. A mapping pointer includes information that help map a logical offset of a file system block to a corresponding physical block address of the file system block.

Further, a mapping pointer of a file system block includes metadata information for the file system block such as a weight that indicates a delegated reference count for the mapping pointer. The delegated reference count is used by a snapshot copy facility when a replica of a file is created. Mapping pointers of the inode of the file are copied and included in the inode of the replica of the file. Mapping pointers of the inode may include mapping pointers pointing to direct data blocks and mapping pointers pointing to indirect data blocks. The delegated reference count values stored in the mapping pointers of the file and the replica of the file are updated to indicate that the file and the replica of the file share data blocks of the file.

The delegated reference counting mechanism is described in U.S. Pat. No. 8,032,498 for "Delegated reference count base file versioning" issued Oct. 4, 2011, which is incorporated herein by reference.

A file-system based snapshot copy facility needs a way of maintaining block ownership information for indicating whether or not each indirect block or data block of a file or a snapshot copy ("replica" or "version") of the file is shared with another version of the file. This block ownership information is accessed each time that the snapshot copy facility writes new data to a file, and each time that the snapshot copy facility deletes a snapshot copy. Further, as introduced above, files in a data storage system are organized as a hierarchy of file system blocks including inodes, indirect blocks, and data blocks. The hierarchy of file system blocks includes a parent-child block relationship between a parent object that points to a child object. For example, if the mapping pointer of the inode of a file points to a data block, the association between the mapping pointer of the inode and the data block may be viewed as a parent-child block relationship. Similarly, for example, if the mapping pointer of an indirect block of a file points to a data block, the association between the mapping pointer of the indirect block and the data block may be viewed as a parent-child block relationship.

Thus, initially when a snapshot copy of a file is created, the snapshot copy of the file shares the entire file system block hierarchy of the file because mapping pointers of the inode of the file are copied to the inode of the snapshot copy of the file (referred to as "snapshot copy inode). Further, if a write I/O operation is performed on a data block of a file for which a snapshot copy has been created, a write split operation breaks the sharing relationship of the data block of the file with the snapshot copy of the file and allocates a new data block for the write I/O request thereby creating a split in the shared file system block hierarchy of the file. Thus, as write operations are performed on a file for which a snapshot copy has been created, only a subset of file system block hierarchy of the file remains shared between the inode of the file and the snapshot inode of the snapshot copy of the file after the write operations are completed on the file.

File System Checking (FSCK) is a process by which a data storage system verifies integrity of a file system and optionally repairs any inconsistencies found during verification of the file system. In at least some systems, a FSCK utility verifies the metadata of a file system, recovers inconsistent metadata to a consistent state and thus restores the integrity of the file system. To verify the metadata of a file system, the FSCK utility traverses the metadata of the file system and gathers information, such as status and bitmaps for the traversed metadata. The FSCK utility stores the gathered information in a memory of the data storage system. The FSCK utility then validates the correctness of the metadata using the information stored in the memory. Additionally, the FSCK utility uses the stored information to restore the integrity of the file system by fixing inconsistencies found during validation of metadata.

The FSCK utility for feature software recovers a data block shared between a file and a replica of the file by using the logical offset (e.g., logical block number) of the data block. When a data block is shared between a file and a replica of the file, the data block has the same logical offset whether the data block is accessed from the file or the replica of the file. The shared data block is recovered using the logical offset of the data block because a replica of the file shares the data block at the same logical offset.

Thus, generally, the inode of a snapshot copy of a file share a portion of a file system block hierarchy of the inode of the file such that a data block that is shared between file and the snapshot copy of the file is located at the same logical offset within the inode and the snapshot copy of the inode.

Conventionally, a FSCK utility validates a file system block hierarchy of the inode of a file of a file system independent of any other inode of the file system such as a snapshot inode of a snapshot copy of the file. Thus, in such a conventional system, a conventional FSCK utility validates metadata of the inode of file and the inode of each snapshot copy of the file independently by iterating over mapping pointers included in each inode. Thus, in such a conventional system, if a large portion of a logical range of the inode of a file is shared between the file and snapshot copies of the file indicating that a large portion of file system block hierarchy of the file is shared between the file and the snapshot copies of the file, a conventional FSCK utility iterates over the shared portion of file system block hierarchy of the file each time metadata of an inode sharing the file system block hierarchy is validated. Thus, in such a conventional system, a conventional FSCK utility repetitively evaluates and validates metadata that has been shared between a file and snapshot copies of the file as each inode sharing the metadata is processed.

Consequently, in such a conventional system, iterating repetitively over a large portion of file system block hierarchy that has been shared between a file and snapshot copies of the file consumes more storage resources and memory of a data storage system.

By contrast, in at least some implementations in accordance with the technique as described herein, a FSCK utility evaluates an inode and snapshot copies of the inode by dividing entire logical range of inodes into chunks and processes each chunk in each inode by storing information regarding the chunk in a summary table such that metadata that has been validated during processing of a chunk is not evaluated again if the metadata in the chunk is shared between two or more inodes. Thus, in at least one embodiment of the current technique, a summary table such as indirect block summary table maintains status information of each metadata object (e.g. indirect block) of a file system block hierarchy of the inode of a file such that if a metadata object of the file is shared between the inode of the file and one or more snapshot inodes of snapshot copies of the file, the metadata object is only validated once and the inodes sharing the metadata object obtains validation information regarding the metadata object from the summary table instead of processing the metadata object repetitively.

In at least some implementations in accordance with the technique as described herein, the use of the analyzing mapping objects in file systems technique can provide one or more of the following advantages: improving memory and storage utilization by efficiently processing metadata of each inode of a file system using a summary table that stores validation information regarding the metadata, and improving performance of a FSCK utility by efficiently validating a file system block hierarchy of a file.

Referring now to FIG. 1, shown is an example of an embodiment of a computer system such as a data storage system that may be used in connection with performing the technique or techniques described herein. A data storage system may be a block based storage system 12 as described herein in FIG. 1. Further, a data storage system may be a file based data storage system as described herein below in FIG. 2. Further, a data storage system may include a block based data storage system component and a file based data storage system component.

While the block based storage system 12 may be configured in a variety of ways, in at least one embodiment, the block based storage system 12 is configured as a storage area network (SAN), such as a CLARiiON™ system, as produced by EMC Corporation of Hopkinton, Mass. While a file based storage system may be configured in a variety of ways, in at least one embodiment, the file based storage system is configured as a network attached storage (NAS) system, such as a Celerra™ system produced by EMC Corporation of Hopkinton, Mass.

The computer system 10 includes one or more block based data storage systems 12 connected to host systems 14a-14n through communication medium 18. The system 10 also includes a management system 16 connected to one or more block based data storage systems 12 through communication medium 20. In this embodiment of the computer system 10, the management system 16, and the N servers or hosts 14a-14n may access the block based data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the block based data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the block based data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the block based data storage systems over an iSCSI or fibre channel connection and the management system may communicate with the block based data storage systems over a separate network connection using TCP/IP. It should be noted that although FIG. 1 illustrates communications between the hosts and block based data storage systems being over a first connection, and communications between the management system and the block based data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the block based data storage systems 12 to perform a data operation. For example, an application executing on one of the host computers 14a-14n may perform a read or write operation resulting in one or more data requests to the block based data storage systems 12.

The management system 16 may be used in connection with management of the block based data storage systems 12. The management system 16 may include hardware and/or software components. The management system 16 may include one or more computer processors connected to one or more I/O devices such as, for example, a display or other output device, and an input device such as, for example, a keyboard, mouse, and the like. A block based data storage system manager may, for example, view information about a current storage volume configuration on a display device of the management system 16. The manager may also configure a block based data storage system 12, for example, by using a management software to define a logical grouping of logically defined devices, referred to elsewhere herein as a storage group (SG), and restrict access to the logical group.

An embodiment of the block based data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). It should be noted that each of the data storage systems may operate stand-alone, or may also included as part of a storage area network (SAN) that includes, for example, other components such as other data storage systems, file based data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the block based data storage system 12 may also include other components than as described for purposes of illustrating the techniques herein.

Figure 2:
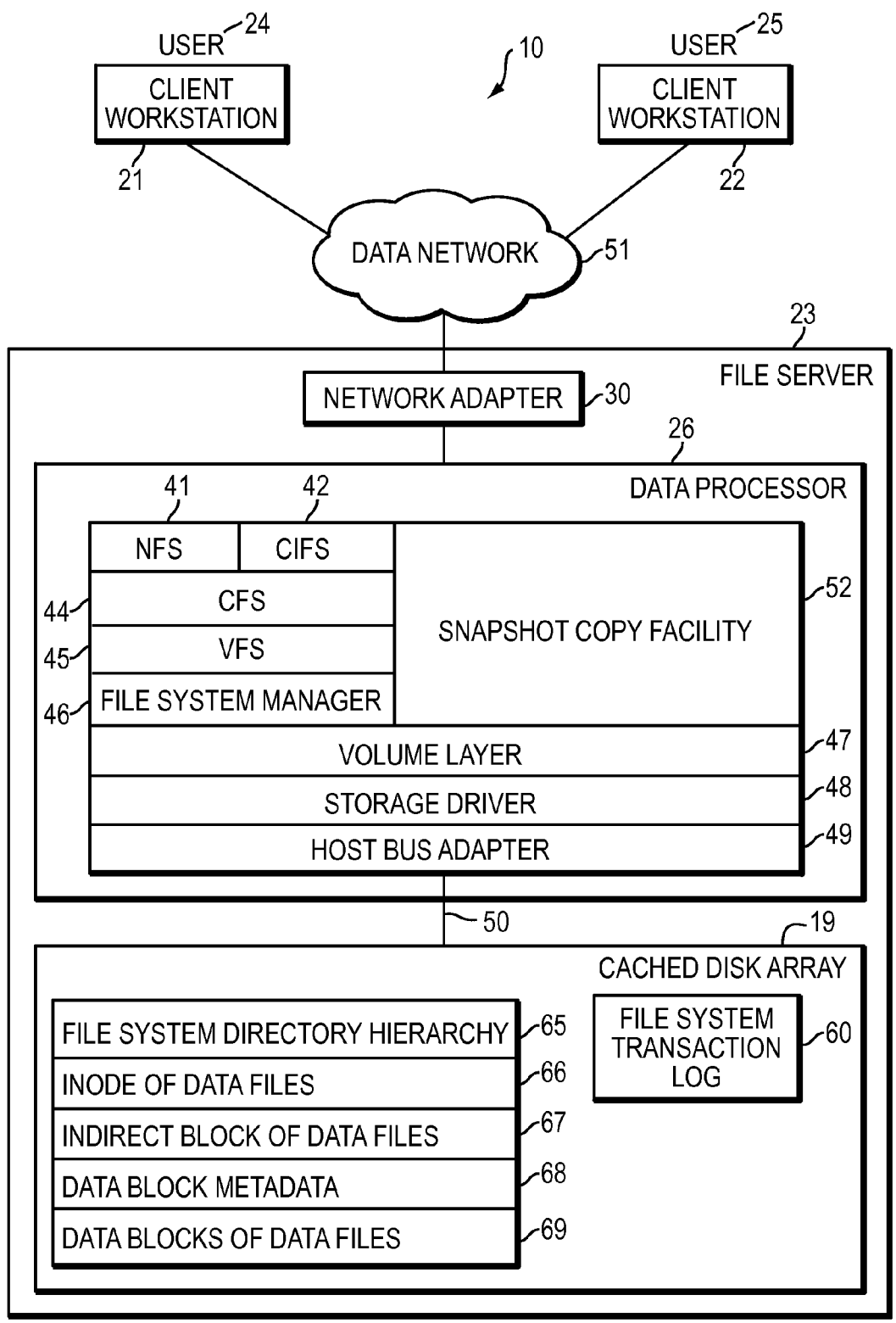

Referring now to FIG. 2, shown is an example of an embodiment of a file based data storage system that may be used in connection with performing the technique or techniques described herein. The file based data storage system 10 includes a data network 51 interconnecting clients 21, 22 and a data storage system such as a network file server 23 (also referred to simply as "file server"). The data network 51 may include any one or more of network connection technologies, such as Ethernet, and communication protocols, such as TCP/

IP. The clients 21, 22, for example, are workstations such as personal computers. The workstations are operated by users 24, 25. The user 25 is a system administrator having sufficient privileges for configuring the network file server 23 and for receiving status and error messages from the network file server. Clients 21, 22 may access the network file server 23, for example, in performing input/output (I/O) operations, data requests, and other operations.

Various aspects of the network file server 23 are further described in Vahalia et al., U.S. Pat. No. 5,893,140 issued Apr. 6, 1999, incorporated herein by reference, Xu et al., U.S. Pat. No. 6,324,581, issued Nov. 27, 2002, incorporated herein by reference, Vahalia et al., U.S. Pat. No. 6,389,420, incorporated herein by reference, Jiang et al., U.S. Patent Application Publication 2005/0240628, published Oct. 27, 2005, incorporated herein by reference, and Jiang et al., U.S. Patent Application Publication 2004/0059822-A1 published Mar. 25, 2004, incorporated herein by reference.

The network file server 23 includes at least one data processor 26 and a cached disk array 19. The data processor 26, for example, is a commodity computer. The cached disk array 19 includes multiple disk drives, a high-speed random-access cache memory, and a logical-to-physical mapping between the cache memory and the disk drives.

The data processor 26 has a network interface 30 for communication of data packets over the data network 51 via a data transmission protocol such as TCP/IP. The data processor 26 is programmed with a Network File System (NFS) module 41 for supporting communication with network clients over the data network 51 using the NFS file access protocol, and a Common Internet File System (CIFS) module 42 for supporting communication with network clients over the data network using the CIFS file access protocol. The NFS module 41, and the CIFS module 42 are layered over a Common File System (CFS) module 44, and the CFS module is layered over a Virtual File System (VFS) module 45. The VFS module 45 is layered over a Universal File System (UxFS) module. The UxFS module is a file system manager 46 for managing a file system such as a UNIX-based file system. The CFS module 44 provides higher-level functions common to NFS 41 and CIFS 42.

The file system manager 46 accesses data organized into logical volumes defined by a logical volume layer module 47. Each logical volume maps to contiguous logical storage addresses in the cached disk array 19. The logical volume layer module 47 is layered over a storage driver 48 such as a Fibre-Channel (FC), a Small Computer System Interface (SCSI), and an Internet SCSI (iSCSI) driver. The data processor 26 sends storage access requests through a host bus adapter 49 using a storage protocol such as the FC, SCSI, or iSCSI used by the storage driver 48, depending on the physical data link 50 between the data processor 26 and the cached disk array 19.

Referring again to FIG. 2, the CFS module 44, the VFS module 45, the file system manager 46, the logical volume layer 47, and the storage driver 48 are modules of an operating system program executing on file server 23. The NFS module 41, and CIFS module 42 are internal application programs supported by the operating system. The data processor 26 is programmed with additional internal application programs including a snapshot copy facility 52.

The data network 51 may be any one or more of a variety of networks or other type of communication connections as known to those skilled in the art. For example, the data network 51 may be the Internet, an intranet, network or other wireless or other hardwired connection(s) by which the clients 21, 22 may access and communicate with the network file server 23, and may also communicate with other components (not shown) that may be included in the network file server 23. Each of clients 21, 22 and the network file server 23 may be connected to the data network 51 by any one of a variety of connections as may be provided and supported in accordance with the type of data network 51.

The processors included in the clients 21, 22 and data processor 26 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the network file server 23 are described herein in more detail, and may vary with each particular embodiment. Each of the clients 21, 22 and the network file server 23 may all be located at the same physical site, or, alternatively, may also be located in different physical locations. Some or all of the connections by which the clients 21-22 and the network file server 23 may be connected may pass through other communication devices, such as a Connectrix or other switching equipment that may exist such as a phone line, a repeater, a multiplexer or even a satellite.

Each of the clients 21, 22 may perform different types of data operations in accordance with different types of tasks. In the embodiment of FIG. 2, any one of the clients 21, 22 may issue a data request to the network file server 23 to perform a data operation. For example, an application executing on one of the clients 21, 22 may perform a read or write operation resulting in one or more data requests to the network file server 23.

An embodiment of the data storage system 10 may include one or more network file servers. Each of the network file server may include one or more data storage devices, such as disks. Each of the network file server included in data storage system 10 may be inter-connected (not shown). Additionally, the network file servers may also be connected to the clients through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the clients, for example, to the network file server 23.

It should be noted that each of the network file server may operate stand-alone, or may also included as part of a storage area network (SAN) that includes, for example, other components such as other network file servers.

Each of the network file servers of element 10 may include a plurality of disk devices or volumes. The particular network file server and examples as described herein for purposes of illustration should not be construed as a limitation. Other types of commercially available data storage systems, as well as processors and hardware controlling access to these particular devices, may also be included in an embodiment.

Clients, such as 21, 22, provide data and access control information through channels to the storage systems, and the storage systems may also provide data to the clients also through the channels. The clients do not address the disk drives of the storage systems directly, but rather access to data may be provided to one or more clients from what the clients view as a plurality of file systems. A file system is created from a logical device or logical volume. The logical volume may or may not correspond to an actual disk drive. For example, one or more logical volumes may reside on a single physical disk drive. Data in a single storage system may be accessed by multiple clients allowing the clients to share the data residing therein. A LUN (logical unit number) may be used to refer to one of the foregoing logically defined devices or volumes.

In such an embodiment in which element 10 of FIG. 2 is implemented using one or more data storage systems, each of the data storage systems may include code thereon for performing the techniques as described herein. In following paragraphs, reference may be made to a particular embodiment such as, for example, an embodiment in which element 10 of FIG. 2 includes a single data storage system, multiple data storage systems, a data storage system having multiple data processors, and the like. However, it will be appreciated by those skilled in the art that this is for purposes of illustration and should not be construed as a limitation of the techniques herein. As will be appreciated by those skilled in the art, the network file server 23 may also include other components than as described for purposes of illustrating the techniques herein.

As shown in the data storage system 10 in FIG. 2, a file system stored on a storage device is organized as a hierarchy. At the top of the hierarchy is a hierarchy of the directories 65 in the file system. Inodes of data files 66 depend from the file system directory hierarchy 65. Indirect blocks of data files 67 depend from the inodes of the data files 66. Data block metadata 68 and data blocks of data files 69 depend from the inodes of data files 66 and from the indirect blocks of data files 67. Specific examples of this hierarchy are further described below with reference to FIGS. 7 and 8. File systems typically include metadata describing attributes of a file system and data from a user of the file system. A file system contains a range of file system blocks that store metadata and data. In at least some embodiments of the current technique, the file system block may be 8 kilobytes (KB) in size. Further, a user of data storage system 10 creates files in a file system.

The data storage system 10 also includes journal such as a file system transaction log 60. In at least one embodiment of the current technique, a journal may include a persistent log or a persistent file that may be used to update metadata of a file system stored on a persistent storage. Generally, any change in metadata of a file system may first be written to file system transaction log 60. Metadata information stored in the file system transaction log 60 is later used to recover the file system when file server 23 reboots due to a failure. Upon reboot of file server 23, file system transaction log 60 is inspected to find a last valid transaction recorded in the log 60, and the last valid transaction is applied to the file system stored on a persistent storage for updating metadata of the file system by using metadata information stored in file system transaction log 60.

Figure 3:
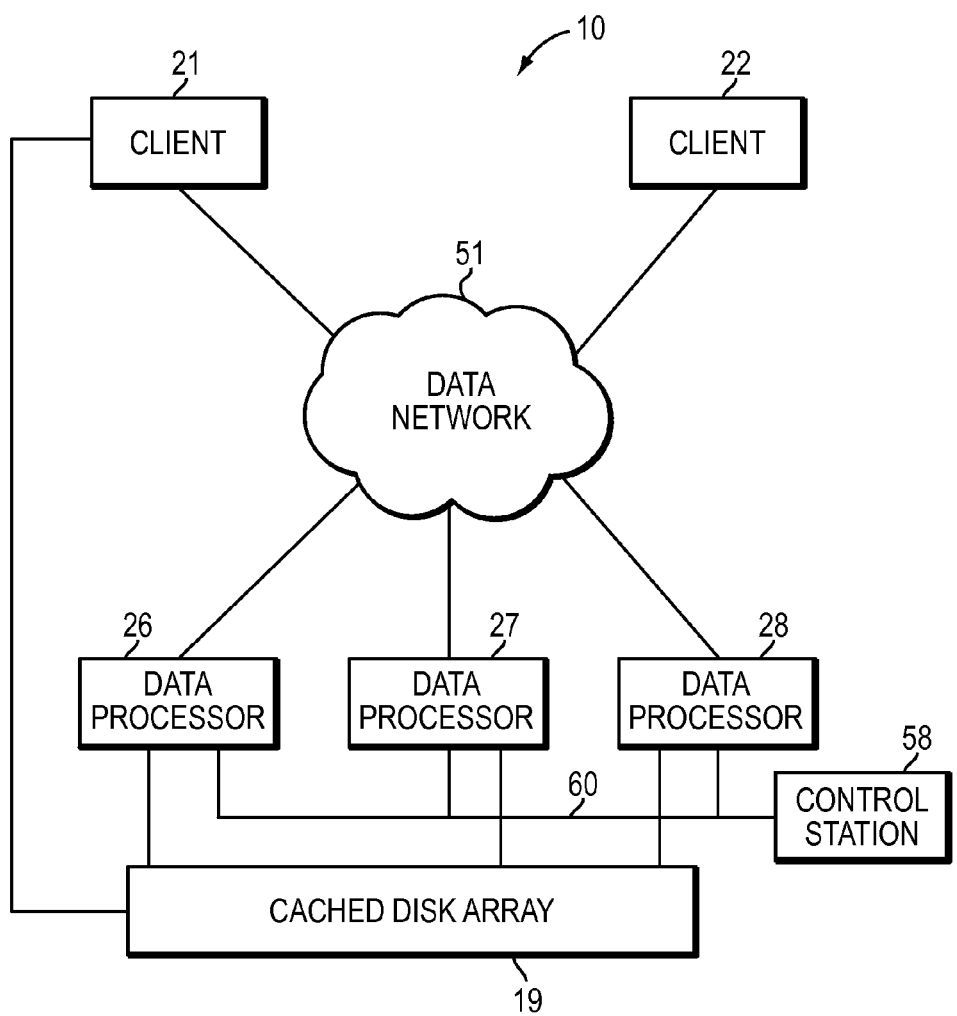

Referring now to FIG. 3, shown is the network file server 23 of FIG. 2 that may further include a control station 58 and additional data processors (such as data processors 27, 28) sharing the cached disk array 19. A dual-redundant data link 60 interconnects the data processors 26, 27, 28 to the control station 58. The control station 58 monitors a heartbeat signal from each of the data processors 26, 27, 28 in order to detect a data processor failure. If a failed data processor cannot be successfully re-booted, the control station 58 will "fence off" the failed data processor and re-assign or fail-over the data processing responsibilities of the failed data processor to another data processor in the network file server 23. With reference also to FIGS. 1-2, the control station 58 also provides a user interface between the system administrator 25 and the network file server 23.

Figure 4:
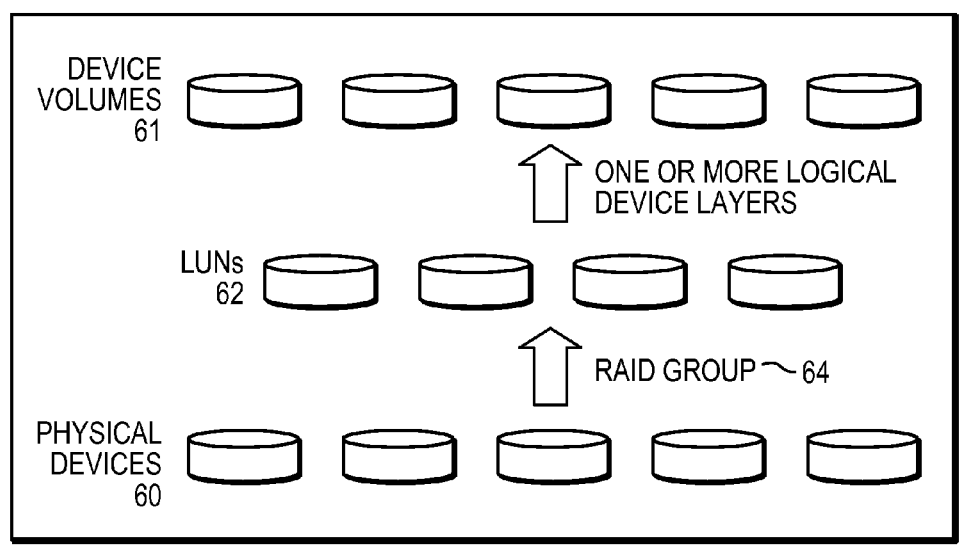
FIGS. 4-10 are diagrams illustrating in more detail components that may be used in connection with techniques herein.

FIG. 4 illustrates one of the many ways of constructing storage extents from a group of physical devices. For example, RAID Group 64 may be formed from physical disk devices 60. The data storage system best practices of a policy may specify the particular RAID level and configuration for the type of storage extent being formed. The RAID Group 64 may provide a number of data storage LUNs 62. An embodiment may also utilize one or more additional logical device layers on top of the LUNs 62 to form one or more logical device volumes 61. The particular additional logical device layers used, if any, may vary with the data storage system. It should be noted that there may not be a 1-1 correspondence between the LUNs of 62 and the volumes of 61. In a similar manner, device volumes 61 may be formed or configured from physical disk devices 60. Device volumes 61, LUNs 62 and physical disk devices 60 may be configured to store one or more blocks of data or one or more files organized as a file system. A storage extent may be formed or configured from one or more LUNs 62.

With reference also to FIGS. 1-3, the data storage system 12 may also include one or more mapped devices. A mapped device (e.g., "thin logical unit", "direct logical unit") presents a logical storage space to one or more applications running on a host where different portions of the logical storage space may or may not have corresponding physical storage space associated therewith. However, the mapped device is not mapped directly to physical storage space. Instead, portions of the mapped storage device for which physical storage space exists are mapped to data devices such as device volumes 61, which are logical devices that map logical storage space of the data device to physical storage space on the physical devices 60. Thus, an access of the logical storage space of the mapped device results in either a null pointer (or equivalent) indicating that no corresponding physical storage space has yet been allocated, or results in a reference to a data device which in turn references the underlying physical storage space. Further, a mapped logical unit (also referred to herein as "mapped LUN") may be mapped to a file system.

Figure 5:
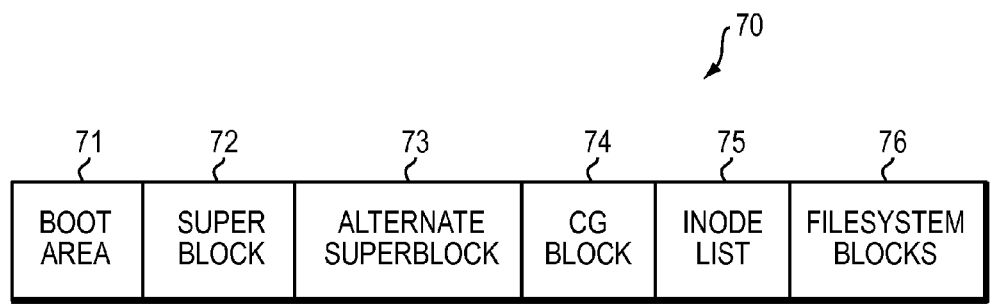

Referring to FIG. 5, shown is a representation of an on-disk layout of a file system that may be included in an embodiment using the current techniques described herein. A file system 70 includes a boot area 71, a superblock 72, an alternate superblock 73, Cylinder Group (CG) block 74, an inode list 75, and file system blocks 76. The boot area 71 may contain code for booting an operating system of file server 23. The superblock 72 and alternate super block 73 contains attributes and metadata of the file system. Cylinder Group block 74 contains metadata information pertaining to cylinder groups of the file system. Inode list 75 includes the list of all inodes of each file that is present in the file system.

A file system 70 includes one or more file system blocks 76. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below. Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block. However, it should be noted that a file system may be organized based on any one of the known mapping techniques such as an extent based binary tree mapping mechanism.

Figure 6:
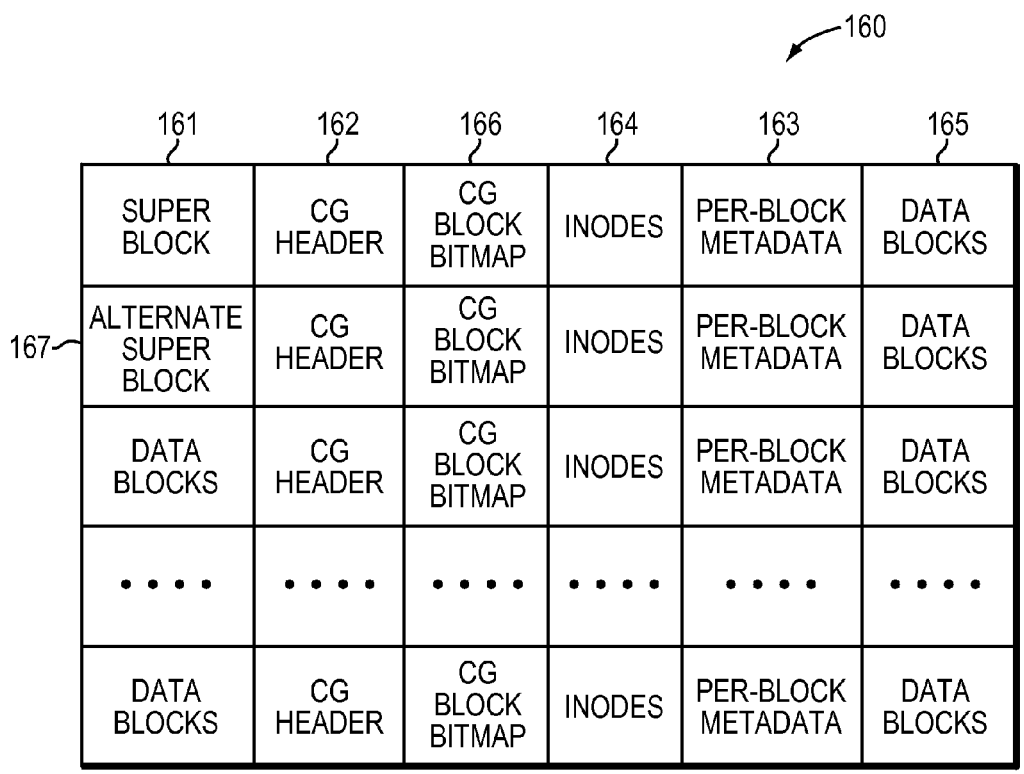

Referring to FIG. 6, shown is a memory map of a logical extent of a file system that may be included in an embodiment using the techniques herein. A logical extent of the file system is subdivided into self-contained cylinder groups. Each cylinder group is of fixed size, such that the size of the cylinder group is the granularity of storage provisioning for the file system. For example, if the file system block size is 8 kilobytes (KB), size of the file system is 4 gigabyte (GB) and size of the cylinder group is 64 megabytes (MB), the file system may include sixty four cylinder group entries, and each cylinder group entry may include 8192 file system blocks. A part of each cylinder group contains metadata of the file system. Other part of each cylinder group contains user's data that is stored in one or more data blocks. Further, each cylinder group includes metadata information that includes a redundant copy of the super-block of a file system, inodes of files of the file system, a bit map describing available blocks in the cylinder group, and information describing the usage of data blocks within the cylinder group. With reference to FIG. 6, each cylinder group (CG) of the file system 160 is a respective row in this memory map. A first cylinder group of the file system 160 indicated by first row of the memory map contains a superblock 161 of the file system, a cylinder group header 162, file system blocks for per-block metadata (BMD) 163 for storing metadata of file system blocks in the cylinder group, inodes 164 of files of file system 160, file system data blocks 165 for the cylinder group, and a cylinder group block bitmap 166 indicating whether or not each file system block in the cylinder group is allocated or not. A second cylinder group of the file system 160 indicated by second row of the memory map has the same format as the first cylinder group. The alternate superblock 167 of the second cylinder group is a copy of the superblock 161 of the first cylinder group. Other cylinder groups have the same format except they do not have a superblock. A file system block can be in one of three states: allocated, free, or reserved. A reserved file system block cannot be allocated or freed. The allocated/free state of a file system block is tracked in the cylinder group block bitmap. Each cylinder group maintains a per-block metadata (BMD) for all file system blocks that it owns. The file system 160 populates the per-block block metadata as and when a file system block is allocated—either for an indirect block or any other metadata block. The per-block metadata 163 is not directly accessible to a network client, and instead it is implicitly accessed in the process of a file system operation that makes use of the cylinder group or file system block contents. For example, the process of allocating or freeing a block of the cylinder group validates and updates block metadata owner state. With reference also to FIGS. 1-3, it should be noted that the memory map of a cylinder group may include other fields (not shown in the FIG. 6) that may be included in a file system stored in data storage system 10.

Figure 7:
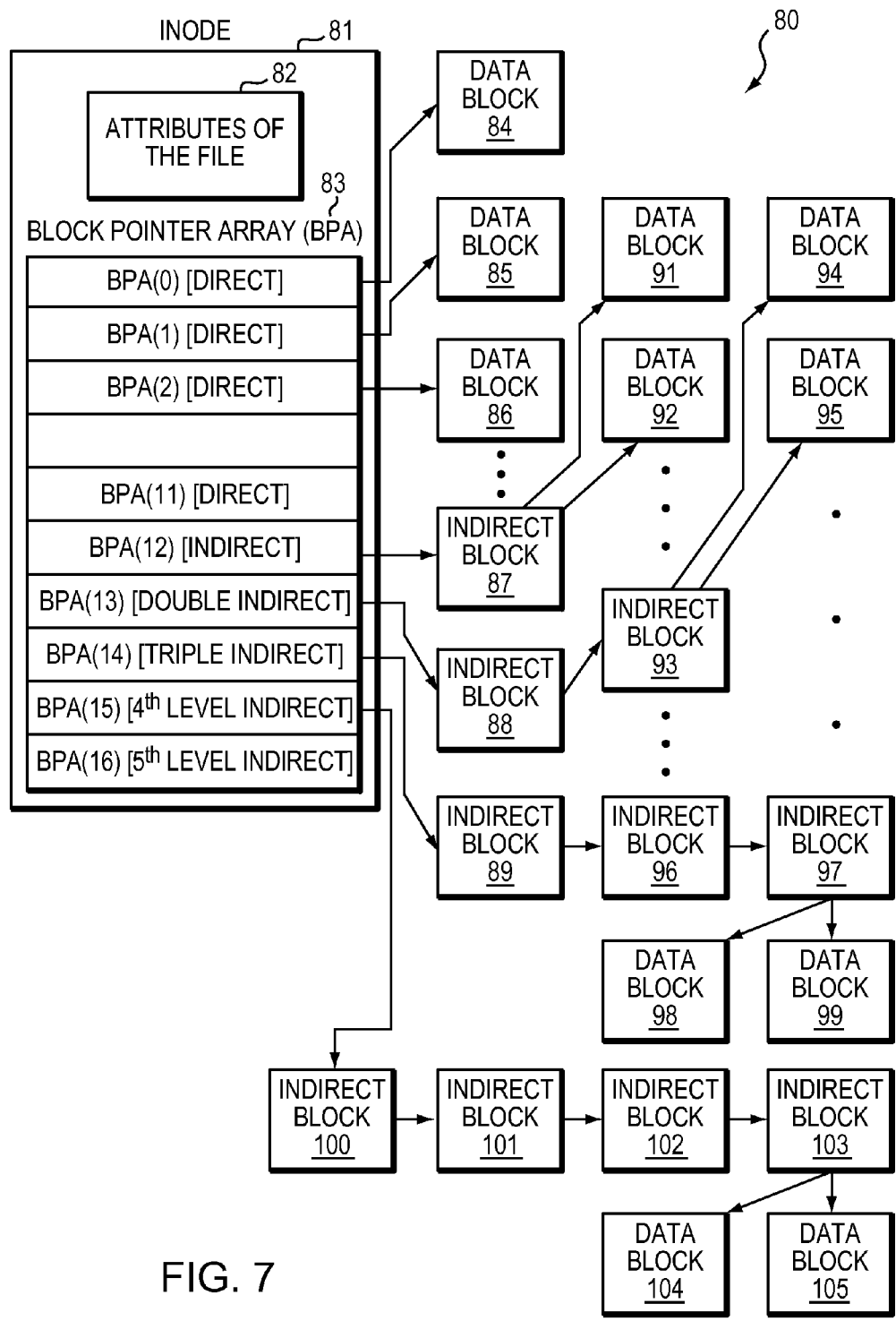

Referring to FIG. 7, shown is a representation of an inode of a file and a file system block tree hierarchy of the file that may be included in an embodiment using the techniques described herein. A file includes an inode 81 containing attributes 82 (such as atime and mtime) of the file, and a block pointer array 83. The block pointer array 83 has seventeen block pointer array entries BPA(0) to BPA(14). The first of up to twelve entries BPA(0) to BPA(11) directly point to the first of up to twelve data blocks (e.g., 84, 85, 86). of the file. If the file contains more than twelve data blocks, then the thirteenth entry of the block pointer array 83 contains an indirect block pointer BPA(12) pointing to an indirect block 87 containing pointers to one or more additional data blocks (e.g., 91, 92). If the file contains so many data blocks that the indirect block 87 becomes full of block pointers, then the fourteenth entry of the block pointer array 83 contains a double indirect block pointer BPA(13) to an indirect block 88 that itself points to an indirect block 93 that points to one or more additional data blocks (e.g., 94, 95). If the file is so large that the indirect block 88 becomes full of block pointers and its descendant indirect blocks are also full of block pointers, then the fifteenth entry of the block pointer array 83 contains a triple indirect block pointer BPA(14) to an indirect block 89 that points to an indirect block 96 that points to an indirect block 97 that points to one or more additional data blocks (e.g., 98, 99). Similarly the file may include fourth (BPA(15)) and fifth (BPA(16)) level of indirections indicated by indirect blocks 100-103 and data blocks 104-105.

Figure 8:
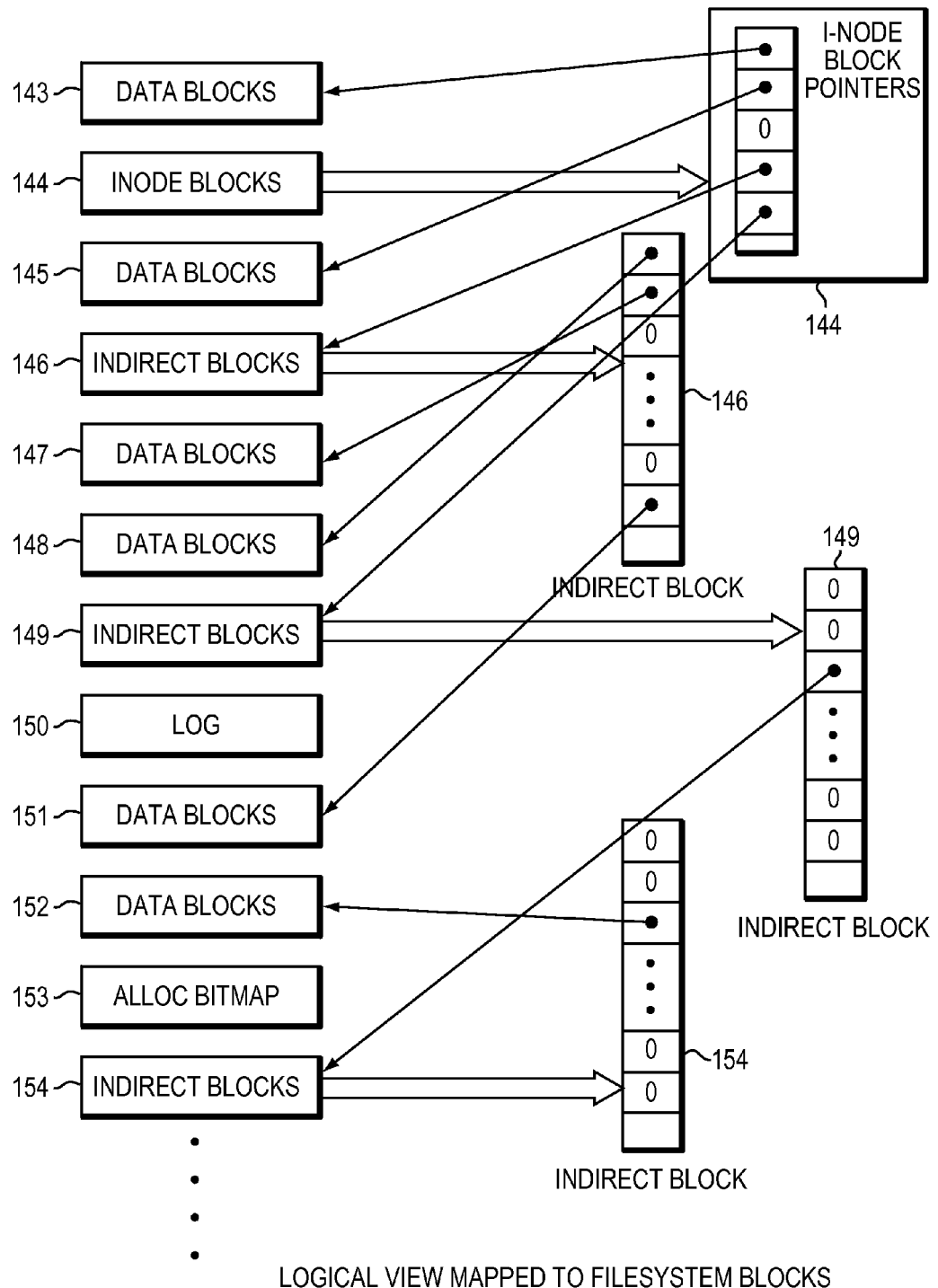

Referring to FIG. 8, shown is a logical and a corresponding physical representation of a file system depicting a standard hierarchical UNIX-based file system using an indirect mapping protocol that may be included in an embodiment using the techniques herein. A file system includes one or more file system blocks. Some of the file system blocks are data blocks 143, 145, 147, 148, 151 and 152, some file system blocks may be indirect block 146, 149 and 154 as described below, or some file system blocks are free blocks that have not yet been allocated to any file in the file system. The first of up to twelve entries of block pointers in the inode 144 directly point to the first of up to twelve data blocks 143, 145, etc. of the file. If the file contains more than twelve data blocks, then the thirteenth entry of the block pointer array 144 contains an indirect block pointer pointing to an indirect block 146 containing pointers to one or more additional data blocks 147, 148, 151, etc. If the file contains so many data blocks that the indirect block 146 becomes full of block pointers, then the fourteenth entry of the block pointer array 144 contains a double indirect block pointer to an indirect block 146 that itself points to an indirect block 149 that points to one or more additional data blocks 152, etc. If the file is so large that the indirect block 149 becomes full of block pointers and its descendant indirect blocks are also full of block pointers, then the fifteenth entry of the block pointer array 144 includes another level of indirection where the block pointer entry contains a triple indirect block pointer to an indirect block that points to an indirect block that points to an indirect block that points to one or more additional data blocks. Similarly there exists fourth and fifth level of indirections. Once the indirect blocks at last level of indirection and its descendant indirect blocks become full of pointers, the file contains a maximum permitted number of data blocks. Log 150 provides transactional semantics to a file system and minimizes number of metadata I/Os by logging updates to metadata of the filesystem in the log 150. Allocation bitmap 153 tracks which file system blocks are free in a file system. An entry indicating a value zero in an indirect block represents unallocated regions of a File or a LUN.

Figure 9:
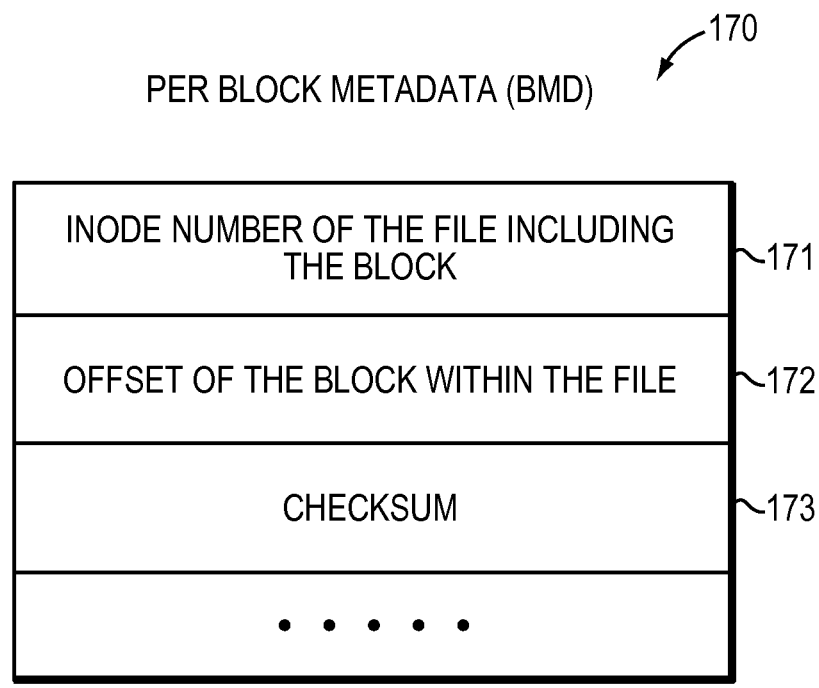

Referring to FIG. 9, shown is a representation of a per block metadata (also referred to as "BMD") for a file system data block that may be included in an embodiment using the techniques described herein. The per-block metadata 170 for a file system data block includes an inode number 171 of a file of the file system to which the data block has been allocated, the file system data block number and the logical offset of the file system data block 172. The per-block metadata 170 for a file system data block also includes an internal checksum 173 for protecting the integrity of the information stored in the per-block metadata 170. The per-block metadata for a file system data block may further include the state of the per-block metadata 170.

Figure 10:
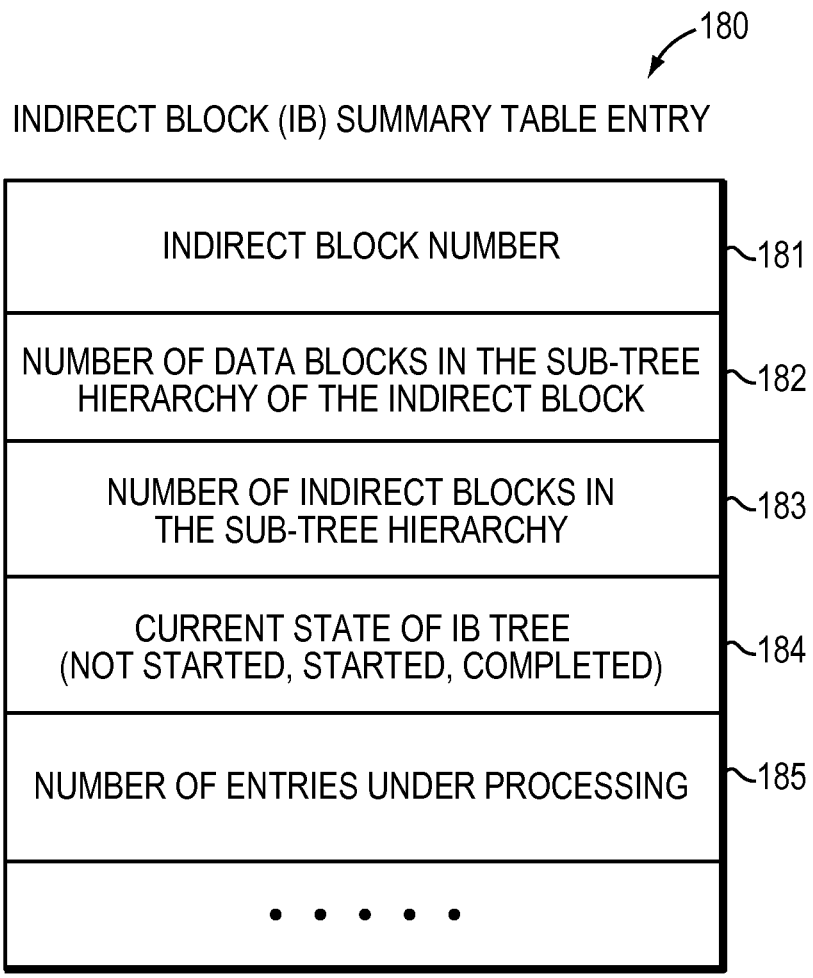

Referring to FIG. 10, shown is a representation of an indirect block summary table entry of an indirect block summary table for an indirect block of a file of a file system that may be included in an embodiment using the techniques described herein. In at least one embodiment of the current technique, an indirect block summary table is used to store information regarding indirect blocks of a file system hierarchy of a file of a file system. The information stored in an indirect block summary table may include status summary information regarding direct data blocks and indirect blocks, and direct bit validation information. Further, a FSCK utility may use a swap space region on a storage device to store an indirect block summary table. Each entry of an indirect block summary table may be indexed based on an indirect block number of an indirect block for which information is stored in that entry. An indirect block summary table entry 180 may include indirect block number 181 of an indirect block for which summary information is stored in that entry, the total number of data blocks in a file system block hierarchy (also referred to herein as "sub tree hierarchy") referenced by the indirect block 182, the total number of indirect blocks in the sub tree hierarchy 183, the current state 184 of processing of the sub tree hierarchy of the indirect block, and the total number of entries that are being processed as part of the sub tree hierarchy 185. Further, the current state 184 of a sub tree hierarchy of an indirect block may include a "not started" state indicating that processing of the sub tree hierarchy has not started yet, a "started" state indicating that processing of the sub tree hierarchy has started, and a "completed" state indicating that processing of the sub tree hierarchy has been completed.

Figure 11:
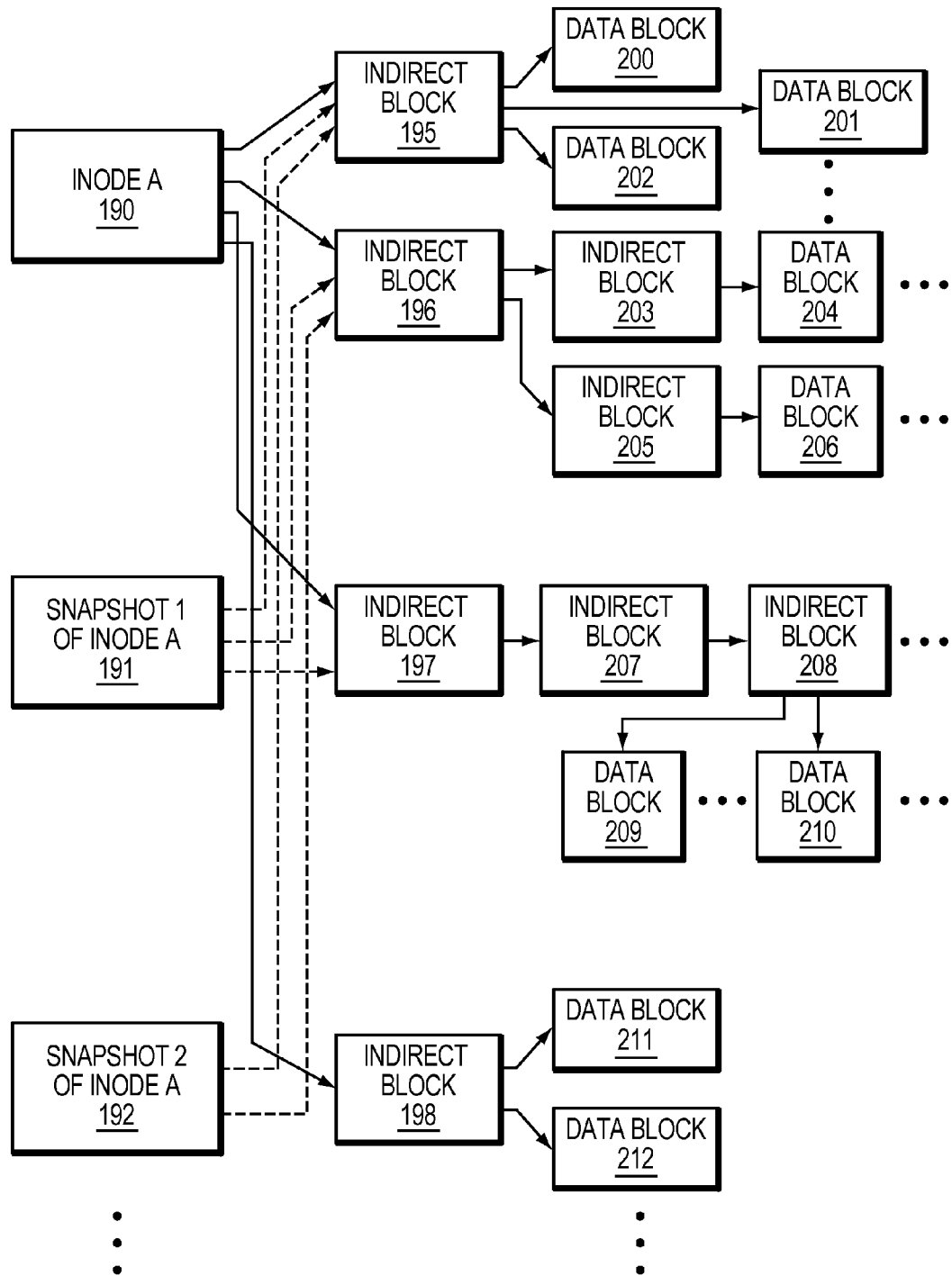
FIGS. 11-12 are flow diagrams illustrating processes that may be used in connection with techniques herein.

Referring to FIG. 11, shown is a detailed representation of components that may be included in an embodiment using the techniques described herein. FIG. 11 illustrates an example file system block hierarchy of a file (e.g., file "A") represented by inode "A" 190. The file system block hierarchy of inode "A" 190 includes indirect blocks 195-198, 203, 205, 207-208 and data blocks 200-202, 204, 206, 209-210, 211-212. A first snapshot copy of the Mode "A" 190 is represented by snapshot inode 191 such that snapshot inode 191 shares indirect blocks 195-197, 203, 205, 207-208 and data blocks 200-202, 204, 206, 209-210. Further, a second snapshot copy of the Mode "A" 190 is represented by snapshot Mode 192 where snapshot Mode 192 shares indirect blocks 195-196, 203, 205 and data blocks 200-202, 204, 206. In the example illustrated in FIG. 11, using a conventional technique, a conventional FSCK utility processes each inode of a file system independent of other inodes of the file system by iterating over metadata associated with entire file system block tree hierarchy of each inode. Thus, conventionally, in such an example, a conventional FSCK utility first processes inode A 190 by validating each indirect block (e.g., 195-198, 203, 205, 207-208) and data blocks included in each indirect block (e.g., 200-202, 204, 206, 209-210, 211-212). In such a conventional system, a conventional FSCK utility then processes the first snapshot inode 191 by validating each indirect block (e.g., 195-197, 203, 205, 207-208) and data blocks included in each indirect block (e.g., 200-202, 204, 206, 209-210). Further, in such a conventional system, a conventional FSCK utility then processes the second snapshot copy inode 192 by validating each indirect block (e.g., 195-196, 203, 205) and data blocks included in each indirect block (e.g., 200-202, 204, 206). Thus, in such a conventional system, indirect blocks 195, 196, 203, 205 and data blocks 200-202, 204, 206 that are referenced by the indirect blocks are processed at least three times as three inodes 190-192 share these indirect blocks and data blocks. Similarly, in such a conventional system, indirect blocks 197, 207, 208 and data blocks 209-210 that are referenced by the indirect blocks are processed at least two times as two inodes 190, 191 share these indirect blocks and data blocks. Consequently, in such a conventional system, per block metadata of a file system block is read and processed as many times as the total number of references to that file system block indicating the number of inodes sharing the file system block.

By contrast, in at least some embodiments of current technique described herein, an indirect block entry is created for each indirect block of a file system hierarchy of a file of a file system in an indirect block summary table. Thus, with reference to an example illustrated in FIG. 11, for example, in at least one embodiment using the current techniques described herein, when an indirect block 195 is processed by one thread, an indirect block entry associated with the indirect block 195 is created in the indirect block summary table and the status of the entry is updated to indicate as to whether validation of a file system block tree hierarchy referenced by the indirect block 195 has been completed. If a second thread starts processing of snapshot inode 191 and attempts to validate indirect block 195 shared between the snapshot inode 191 and inode 190, the second thread first checks the indirect block summary table and upon finding an indirect block entry corresponding to indirect block 195 in the indirect block summary table, the second thread skips processing of a file system block tree hierarchy (e.g., data blocks 200-202) referenced by the indirect block 195 and obtains results of validation of indirect block 195 from the indirect block summary table at a later time when the first thread finishes validating the indirect block 195. Thus, the amount of time and storage resources required to validate a file system block tree hierarchy of a file system that has been shared between the inode of a file and snapshot inodes of snapshot copies of the file is significantly reduced.

Figure 12:
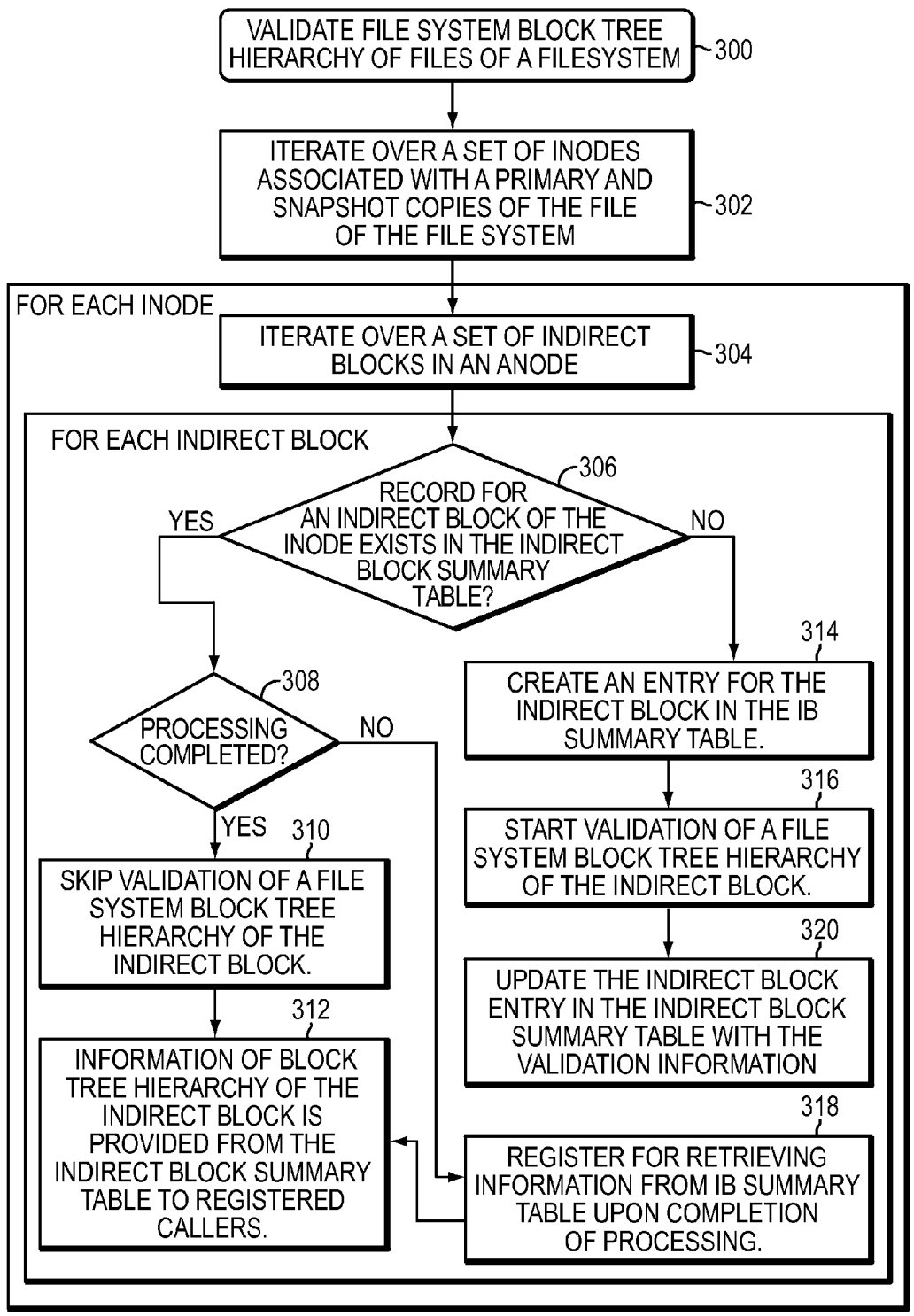

Referring to FIG. 12, shown is a flow diagram illustrating the method of analyzing mapping objects of file systems. With reference also to FIGS. 1-11, in at least one embodiment of the current technique, a FSCK utility validates a file system block hierarchy of each file of a file system such that the inode of a file of the file system refers to a file system block tree hierarchy of that file (step 300). Each data block and indirect block of a file of a file system is associated with metadata. Metadata of a data block and an indirect block may include the total number of references that are acquired on the data block indicating the number of snapshot copies that may be sharing the data block. The FSCK utility validates a file system by iterating over each inode of a set of inodes of the file system such that the set of inodes may include the primary inode of a primary file and snapshot inodes of snapshot copies of the primary file (step 302). For each inode, the FSCK utility traverses a file system block tree hierarchy of the inode by iterating over a set of indirect blocks included in the file system block tree hierarchy (step 304). It should be noted that the FSCK utility traverses file system block tree hierarchies of the set of inode simultaneously with respect to a logical extent. The size of a logical extent may be equivalent to traversing a first level indirect block. For each indirect block of a file system hierarchy that is iterated over by the FSCK utility, a determination is made as to whether an entry for the indirect block exists in an indirect block summary table (step 306). Upon determining that no such entry exists in the indirect block summary table, a new entry for the indirect block is created in the indirect block summary table (step 314). The FSCK utility starts validation of metadata of the indirect block by processing a sub tree hierarchy of the indirect block (step 316). Further, the status of the new entry is updated to indicate that processing of metadata of the indirect block has been started. Further, when the FSCK utility finishes processing and validation of metadata of the indirect block, the indirect block entry is updated with result information (step 320).

However, upon determining that an entry exists in the indirect block summary table for the indirect block, the status of the entry is checked to determine whether processing of metadata of the indirect block has been completed (step 308). Upon determining that processing of the metadata of the indirect block has not been completed, a thread iterating over the indirect block registers for receiving a callback such that the callback provides information from the indirect block summary table regarding results of processing of metadata of the indirect block to the thread upon completion of the processing (step 318). Further, upon determining that processing of the metadata of the indirect block has been completed, metadata of the indirect block is not validated again by subsequent threads thereby avoiding repetitively processing a data block hierarchy of the indirect block that has been shared between two or more inodes (step 310). Thus, in such a case, validation information of the shared block tree hierarchy is provided from the indirect block entry of the indirect block summary table (step 312).

In at least one embodiment of the current technique, a FSCK utility using the current technique as described herein iterates over inodes and snapshot inodes of a file system by selecting a logical range for each iteration such that an iteration starts from a leaf level indirect block and each iteration processes a logical range of fixed predefine size. Further, an iteration of inodes and snapshot copies of the inodes may start from a logical offset of zero and end at the largest logical offset for the inodes and the snapshot copies of the inodes. Thus, inodes and snapshot copies of the inodes are iterated by dividing entire logical range of the inodes and snapshot copies of the inodes in fixed sized chunks. When processing each chunk (e.g. indirect block) in each inode, the FSCK utility creates a record in an indirect block summary table for that chunk if such a record does not exists already such that when another inode is processed by the FSCK utility such that the other inode includes the same logical range that is represented by the chunk for which the entry has been created in the indirect block summary table, a thread processing the other inode does not again process that chunk and is able to determine the status of the processing of the shared chunk from the newly created entry in the indirect block summary table. Thus, if the status of an indirect block entry in the indirect block summary table indicates that processing of the indirect block is in progress, subsequent inodes sharing the same indirect block simply register to the indirect block entry of the indirect block summary table such that upon completion of processing of the shared indirect block, results (e.g., summary information) of the processing of the shared indirect block may be provided to the subsequent inodes that have registered for receiving such information from the indirect block summary table. Further, if the status of an indirect block entry in the indirect block summary table indicates that processing of the indirect block has been completed, result summary information may simply be obtained from the indirect block summary table and used by an inode sharing the indirect block thereby avoiding duplicate processing of a file system block hierarchy of the indirect block by the inode sharing the indirect block.

In at least one embodiment of the current technique, an indirect block summary table maintains an entry for each unique indirect block of file system block hierarchy of files of a file system such that a process performing validation of an inode sharing a logical range of any size with other inodes is able to find an existing entry in the indirect block summary table associated with the shared logical range thereby skipping validation of the shared logical range. It should be noted that the size of a logical range may be file system data block hierarchy referred to by a single indirect block. Thus, a file system data block hierarchy referred to by an indirect block that has been shared between two or more inodes is only processed and validated once by the FSCK utility. Further, the number of inodes in a chunk that is processed by the FSCK utility may be configured dynamically in accordance with usage of a memory during the time the FSCK utility validates metadata of a file system. Further, if a large portion of a set of file system blocks is shared by two or more inodes, there is a high probability that a per block metadata of a file system block is cached in a memory of a data storage system thereby reducing the number of I/O operations performed to retrieve per block metadata of file system blocks.

In at least embodiment of the current technique, inodes of a file system are divided into a set of groups such that inodes within a group are processed simultaneously with respect to a logical offset extent. Further, each group of inodes are processed by a set of threads such that each thread process a work item from an inode group. Further, a thread processes a work item from a current inode group and continue processing work items until no more work items are left in the current inode group. When the thread finish processing the last work item in the current inode group, the thread continues processing a next inode group. A work item represents an extent of an inode and may include an indirect block such that a thread processing the work item validates each block pointer of the indirect block. An inode group may include information such as an inode range indicating the inode number of the first inode and the inode number of the last inode within the inode group, and the current inode group that is being processed.

Further, in at least one embodiment of the current technique, a FSCK utility stores an indirect block summary table on a swap storage space created on a storage device. Further, the FSCK utility may also store an indirect block summary table in a memory of a data storage system such that the indirect block summary table organized in the memory of the data storage system may include additional information required for validating metadata of inodes of a file system. Additionally, when the FSCK utility finish processing of an inode group and start processing a next inode group, new indirect block entries that are required to be stored in the indirect block summary table organized in the memory of the data storage system invalidates indirect block entries that have been moved to the indirect block summary table organized on the swap storage space such that additional storage space may be created in the indirect block summary table stored in the memory in order to store the new indirect block entries thereby enabling the FSCK utility to store a large amount of information in the memory.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in analyzing mapping objects of file systems, the method comprising:

analyzing each inode of a set of inodes of files of a file system by iterating over the set of inodes, wherein a file is associated with a first inode of the set of inodes and a snapshot copy of the file is associated with a second inode of the set of inodes, wherein the second inode shares a subset of a set of storage objects associated with the first inode, wherein an inode of a file refers to a file system block hierarchy of the file, wherein a set of storage objects associated with an inode includes a set of file system blocks, wherein a file system block includes an indirect data block, wherein the snapshot copy of the file represents a point in time copy of the file, wherein the snapshot copy is created by creating a version of the inode of the file, wherein the version of the inode shares a subset of file system block hierarchy of the inode of the file;

determining for each indirect data block of each inode of the set of inodes whether information regarding an indirect data block exists in a summary table;

processing the indirect data block and storing information for the indirect data block in the summary table upon determining that the information regarding the indirect data block does not exist in the summary table; and skip processing the indirect data block upon determining that the information regarding the indirect data block exist in the summary table and the indirect data block is shared by the file and the snapshot copy of the file, wherein a callback is registered for receiving updated information regarding the indirect data block stored in the summary table.

2. The method of claim 1, wherein processing an indirect data block of an inode includes validating the indirect data block.

3. The method of claim 1, wherein a file of the file system is associated with an inode, wherein the file includes a set of file system blocks organized in a file system block hierarchy, wherein a file system block includes a data block and an indirect block.

4. The method of claim 1, wherein a storage object of a set of storage objects associated with an inode associated with a file includes an indirect block, wherein the indirect block includes a set of data blocks organized in a file system block tree hierarchy.

5. The method of claim 1, further comprising:

creating an indirect block summary table for storing information of each indirect block of a set of indirect blocks of an inode of a file of a file system.

6. The method of claim 5, wherein the indirect block summary table includes a set of indirect block summary entries, wherein each indirect block summary entry of the set of indirect block summary entries is associated with an indirect block of an inode of a file of a file system, wherein each indirect block summary entry of the set of indirect block summary entries includes an indirect block number of an indirect block associated with the indirect block summary entry, a number of data blocks in a file system block tree hierarchy represented by the indirect block, and a state of processing of the file system block tree hierarchy.

7. The method of claim 1, further comprising:

a) iterating over a set of indirect blocks of each inode of the file system;
b) determining, based on whether an entry exists in an indirect block summary table for an indirect block of a set of indirect blocks associated with an inode of the file system, whether to skip validating a file system block tree hierarchy represented by the indirect block;
c) based on a negative determination, creating a new entry in the indirect block summary table representing the indirect block and start validation of the file system block tree hierarchy represented by the indirect block;
d) based on a positive determination, skip validating the file system block tree hierarchy represented by the indirect block, and determining a status of validation of the file system block tree hierarchy represented by the indirect block from the indirect block summary table; and repeating steps b)-d) until each indirect block of a set of indirect blocks of each inode of the file system is processed.

8. A system for use in analyzing mapping objects of file systems, the system comprising:

a hardware processor configured to:

analyze each inode of a set of inodes of files of a file system by iterating over the set of inodes, wherein a file is associated with a first inode of the set of inodes and a snapshot copy of the file is associated with a second inode of the set of inodes, wherein the second inode shares a subset of a set of storage objects associated with the first inode, wherein an inode of a file refers to a file system block hierarchy of the file, wherein a set of storage objects associated with an inode includes a set of file system blocks, wherein a file system block includes an indirect data block, wherein the snapshot copy of the file represents a point in time copy of the file, wherein the snapshot copy is created by creating a version of the inode of the file, wherein the version of the inode shares a subset of file system block hierarchy of the inode of the file;

determine for each indirect data block of each inode of the set of inodes whether information regarding an indirect data block exists in a summary table;

process the indirect data block and store information for the indirect data block in the summary table upon determining that the information regarding the indirect data block does not exist in the summary table; and skip processing the indirect data block upon determining that the information regarding the indirect data block exist in the summary table and the indirect data block is shared by the file and the snapshot copy of the file, wherein a callback is registered for receiving updated information regarding the indirect data block stored in the summary table.

9. The system of claim 8, wherein processing an indirect data block of an inode includes validating the indirect data block.

10. The system of claim 8, wherein a file of the file system is associated with an inode, wherein the file includes a set of file system blocks organized in a file system block hierarchy, wherein a file system block includes a data block and an indirect block.

11. The system of claim 8, wherein a storage object of a set of storage objects associated with an inode associated with a file includes an indirect block, wherein the indirect block includes a set of data blocks organized in a file system block tree hierarchy.

12. The system of claim 8, further comprising:

create an indirect block summary table for storing information of each indirect block of a set of indirect blocks of an inode of a file of a file system.

13. The system of claim 12, wherein the indirect block summary table includes a set of indirect block summary entries, wherein each indirect block summary entry of the set of indirect block summary entries is associated with an indirect block of an inode of a file of a file system, wherein each indirect block summary entry of the set of indirect block summary entries includes an indirect block number of an indirect block associated with the indirect block summary entry, a number of data blocks in a file system block tree hierarchy represented by the indirect block, and a state of processing of the file system block tree hierarchy.

14. The system of claim 8, further comprising:
   a) iterate over a set of indirect blocks of each inode of the file system;
   b) determine, based on whether an entry exists in an indirect block summary table for an indirect block of a set of indirect blocks associated with an inode of the file system, whether to skip validating a file system block tree hierarchy represented by the indirect block;
   c) create, based on a negative determination, a new entry in the indirect block summary table representing the indirect block and start validation of the file system block tree hierarchy represented by the indirect block;
   d) skip validating, based on a positive determination, the file system block tree hierarchy represented by the indirect block, and determining a status of validation of the file system block tree hierarchy represented by the indirect block from the indirect block summary table; and
   repeating logic b)-d) until each indirect block of a set of indirect blocks of each inode of the file system is processed.

\* \* \* \* \*